3,098,085
PROCESS FOR THE MANUFACTURE OF 16α-METHYL-ALLOPREGNANES SUBSTITUTED IN THE 21-POSITION
Albert Wettstein, Georg Anner, Charles Meystre, Peter Wieland, Ludwig Ehmann, Karl Heusler, Alfred Hunger, and Jindrich Kebrle, all of Basel, Switzerland, assignors to Ciba Corporation, a corporation of Delaware
No Drawing. Filed July 1, 1959, Ser. No. 824,210
Claims priority, application Switzerland July 4, 1958
9 Claims. (Cl. 260—397.45)

The present invention relates to an industrially simple process for the manufacture of 16α-methyl-allopregnane-17α-ol-3:20-diones substituted in the 21-position from 16α-methyl-allopregnane-3β:17α-diol-20-ones.

For the preparation of 17α-hydroxy-21-acetoxy-allopregnane- and -pregnane-3:20-diones from 3β- or 3α:17α-dihydroxy-allopregnane- and -pregnane-20-ones respectively three process steps are required according to known processes in which the reaction product has to be isolated from the reaction medium after each step by precipitation or extraction. The waste of auxiliary substances (particularly solvents), of energy (e.g. to evaporate the extracts) and of work is considerable. The operation, for instance, is carried out in such a way that hydrogen chloride is introduced into chloroform containing alcohol, the 17α-hydroxy-20-ketone is added and finally bromine is added dropwise. If the 21-bromo-ketone does not precipitate, the chloroform solution must be carefully washed till neutral and evaporated. The bromoketone is then heated in acetone or in dimethyl formamide with potassium or sodium acetate for some time and the 21-acetoxy-ketone formed extracted after adding water with a solvent, such as chloroform, ethyl acetate, benzene or the like. The residue of the extracts is then again dissolved in acetone or methylene chloride, oxidized with N-bromoacetamide or N-bromosuccinimide and the end product isolated by being extracted again.

When using this process with the new 16α-methyl-pregnane compounds of the present invention, it was found that it can be carried out much more simply and industrially more advantageously when a 16α-methyl-allopregnane-3β:17α-diol-20-one is brominated in an alcohol containing solvent to which a lower aliphatic acid halide has been added, the resulting 21-bromide reacted with an alkali metal salt of a lower fatty acid, the free 3β-hydroxyl group oxidized without isolating the intermediate product, and if desired, any 11α-hydroxyl group present is esterified.

This process avoids the addition of gaseous hydrogen halide, which in practice is complicated, and uses in its place an acid halide of which the dosage is easy to control, such as acetyl chloride, acetyl bromide, propionyl chloride etc. When bromination of the 16α-methyl-compounds to be used according to the present process is carried out under suitable conditions, e.g. in chloroform, the sparingly soluble 21-bromide can be separated directly by filtration in every case so that no extraction is necessary.

The crude bromide is then taken up in a solvent and reacted with an alkali metal salt of a lower fatty acid, for example with sodium acetate, potassium acetate, potassium propionate etc. According to the process of the invention a solvent is used which is stable in the subsequent oxidation of the hydroxyl group in the 3-position. Up to the present, for the reaction with an alkali metal salt there have been used more especially acetone, glacial acetic acid or dimethyl formamide. These solvents dissolve the bromide and the alkali metal salt at least to a certain degree. Of the above solvents, acetone can also be used in the present, simplified process.

For the subsequent oxidation of the 3β-hydroxyl group there is used an N-chloro- or N-bromocarboxylic acid amide or -imide, e.g. bromosuccinimide or bromoacetamide; the oxidizing agent is advantageously added in aqueous solution directly to the reaction solution which is freed from any inorganic salts as completely as possible. Separation is carried out when acetone is used by adding a little water, whereby the salts are transformed into a hydrated, sparingly soluble form, and/or by filtration, preferably after cooling the reaction mixture extensively, the reaction product not being allowed, however, to crystallize out. The oxidation in aqueous medium is usually finished in a few hours. The excess oxidizing agent is then destroyed with sulfite and the end product can be isolated in known manner.

Surprisingly, the above oxidizing agents can also be used easily for oxidizing the hydroxyl group in the 3-position of 16α-methyl-21-acyloxy-allopregnane-3β:11α:17α-triol-20-ones selectively, that is to say without affecting the hydroxyl group in the 11α-position. In the resulting 11α-hydroxy-compounds this group can be easily esterified in known manner, e.g. with acetic anhydride or especially with a reactive derivative of sulfonic acid, such as for example methane-sulfonic acid chloride or para-toluene-sulfonic acid chloride. The resulting 11α-mesylates and 11α-tosylates are particularly valuable, since in these compounds the sulfonic acid ester group can be easily split off with the formation of a 9:11-double bond. The 21-acyloxy-11α-sulfonyloxy compound can also be prepared from an 11α:21-dihydroxy compound by first acylating the 21-hydroxyl group with a calculated quantity of acylating agent and then reacting the monoacylate with a sulfonic acid chloride.

The starting materials for the present process are prepared by the process described in our copending application Serial No. 824,202, filed July 1, 1959, from the correspondingly substituted, known Δ$^{16}$-20-ketones having a hydrogen atom in 16-position. This process consists in oxidizing a Δ$^{17(20)}$-16α-methyl-20-acetoxy-allopregnene, obtained by subjecting a corresponding Δ$^{16}$-20-ketone unsubstituted in 16-position to the action of methyl magnesium iodide in the presence of cuprous chloride and reaction with acetyl chloride, with a peracid and subjecting the resulting 17:20-oxido-20-acetate to alkaline hydrolysis.

The new products are compounds of the formula

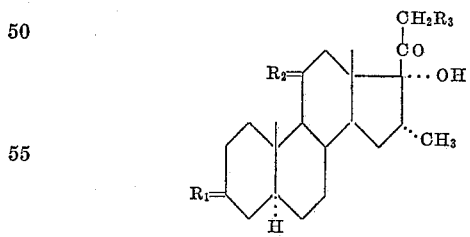

in which $R_1$ and $R_2$ each stand for an oxo group or a hydrogen atom together with a free or esterified hydroxyl group and $R_3$ for a bromine atom or a free or esterified hydroxyl group. Especially important are those compounds which have in the 3-position a free hydroxyl group and in the 21-position a bromine atom or an esterified, more especially an acetylated hydroxyl group, and the 3-ketones obtained from these compounds by oxidation. These compounds may have a keto group or a free 11β- or 11α-hydroxyl group or an esterified 11α-hydroxyl group in the 11-position. Among the 11α-esters the sulfonic acid esters, such as methane-sulfonates (mesylates) or para-toluene-sulfonates (tosylates), are of especial importance as intermediate products for the preparation of 9-halogen derivatives.

The products of the process are important intermediate products for the manufacture of 16α-methyl-corticosteroids which are distinguished by a particularly strong anti-inflammatory action without at the same time having the side-effect of sodium retention or only to a very slight degree. Among these highly active corticosteroids there may be mentioned more especially 16α-methyl- prednisone, 16α-methyl-prednisolone, 16α-methyl-9α-fluoro-prednisone and 16α-methyl-9α-fluoro-prednisolone. The end products of the present process belong to the 5α-(allo-)series. The starting materials used in the present process are easily prepared from raw materials from plants, especially from hecogenin from sisal agaves. The present process is therefore an important step in the synthesis of the above mentioned valuable hormones from readily accessible starting materials which are available in large quantities. The conversion of the products of the invention into these highly active compounds is carried out by the process described in our copending application Serial No. 824,209, filed July 1, 1959, now abandoned, which consists in treatment of the 3-ketones obtained by the process of the present invention with selenium dioxide and to introduce a 1:2- or 4:5-double bond.

If desired, an 11-keto group present can be reduced to an 11β-hydroxyl group before the double bonds are introduced into ring A. This reduction is advantageously carried out with a complex metal hydride, for example sodium borohydride, in an anhydrous or aqueous solvent, for example methanol or tetrahydrofuran. During this reaction any keto groups present in positions 3 and 20 must be temporarily protected, for example by ketalization or by conversion into a semicarbazone. From the ketals or semicarbazones respectively the free ketones can be reformed by acid hydrolysis, if necessary with the addition of a ketone, such as acetone or pyruvic acid.

If necessary, an 11-hydroxyl group can be eliminated with the formation of a 9:11-double bond; this is achieved with a dehydrating agent such as thionyl chloride, phosphorus oxychloride, methane-sulfonyl chloride or the like, in the presence of a basic compound, for example pyridine, collidine or the like. Furthermore, it is particularly easy to eliminate hydroxyl groups in the 11β-position by treatment with a mixture of pyridine with bromacetamide or bromosuccinimide and subsequent treatment with sulfur dioxide. 11α-sulfonic acid ester groups, for example tosylates or mesylates, can also be eliminated in good yield by treatment with a solution of lithium chloride in dimethyl formamide. The 11-keto group can be reduced, or the 11-hydroxyl group eliminated, prior to or subsequent upon the introduction of the 21-acetoxy and/or 3-keto grouping.

A possibly required conversion of the 9:11-double bond into a 9:11-epoxide, a 9α-chloro- or 9α-fluoro-11-hydroxy or -11-keto grouping is performed by the known method. The 9:11-double bond is additively combined with hypobromous acid in the presence of a strong acid, for example perchloric acid; hydrobromic acid is eliminated with the aid of a basic agent such as potassium acetate or lithium acetate; and the resulting 9:11β-epoxide is treated with hydrochloric or hydrofluoric acid. Oxidation, for example with chromic acid-pyridine complex, yields the corresponding 11-ketone.

The following examples illustrate the invention:

*Example 1*

15 cc. of acetyl bromide are slowly added dropwise to a mixture of 700 cc. of chloroform and 15 cc. of alcohol, and after 1 hour 1.0 gram of 16α-methyl-allopregnane-3β:17α-diol-11:20-dione is added. 60 cc. of a 0.1-molar solution of bromine in chloroform are then added dropwise at room temperature.

When the reaction solution has become colorless, it is washed with dilute sodium bicarbonate solution and water and evaporated in vacuo, to yield crystalline 16α-methyl-21-bromo-allopregnane-3β:17α-diol-11:20 - dione melting at about 235° C. with decomposition.

1.2 grams of the above bromide are dissolved in 300 cc. of boiling acetone and 5.0 grams of potassium acetate are added and the mixture is boiled for 5 hours. The reaction mixture is then cooled to about 10° C., filtered and the salt residue washed with a little cold acetone.

A solution of 2.5 grams of N-bromacetamide in 100 cc. of water is added to the filtrate and stirred overnight at room temperature. The dark colored reaction mixture is diluted with water and sodium bisulfite solution of 30% strength and extracted with methylene chloride. The methylene chloride solution is washed with water and sodium bicarbonate solution, dried, and evaporated in vacuo. The resulting 16α-methyl-21-acetoxy-allopregnane-17α-ol-3:11:20-trione is purified by recrystallization from acetone. It melts at 214–216° C.

*Example 2*

A solution of 1.768 grams of bromine in 20 cc. of chloroform is slowly stirred dropwise within 30 minutes into a suspension of 4.0 grams of 16α-methyl-allopregnane-3β:17α-diol-11:20-dione in 60 cc. of chloroform to which 1.5 cc. of alcohol and 1.5 cc. of acetyl chloride have been added 1 hour previously. The reaction product is obtained in a crystalline form while the bromination is still proceeding. 80 cc. of ether are added, the mixture is suction-filtered, and the residue is rinsed with ether, to yield 4.32 grams of the 21-bromide melting at 230 to 240° C. (with decomposition). The residue (1.93 grams) of the filtrate washed with water and dried, yields on addition of ether another 620 mg. of the 21-bromide melting at 235–240° C. (with decomposition). The resulting bromide is reacted in acetone with potassium acetate as described in Example 1 and oxidized with N-bromacetamide. It is possible, however, to react the bromide in two stages as follows:

3.0 grams of the above bromide are stirred in 15 cc. of dimethyl formamide and 1.5 grams of anhydrous sodium acetate for 2 hours at 60° C. under nitrogen. The mixture is then diluted with water, extracted with ethyl acetate, the extracts are washed with water, dried and evaporated to dryness in a water-jet vacuum, to yield in two fractions from acetone+ether a total of 2.6 grams of 16α-methyl-21-acetoxy - allopregnane-3β:17α-diol-11:20-dione in crystals which turn opaque at about 110° C. and then melt at 210–213° C. The infrared spectrum of the compound in methylene chloride contains inter alia the following bands: $2.77\mu$ (hydroxyl); $5.71\mu$ (acetate); $5.77\mu$ (20-ketone); $5.85\mu$ (11-ketone). Optical rotation $[\alpha]_D^{28.3} = +72.4°$ (c.=1.2434 in chloroform).

1 gram of the above 21-acetate is dissolved in 20 cc. of methylene chloride and 2 cc. of pyridine, treated with 1 gram of bromosuccinimide and stirred overnight at room temperature. The clear solution of the reaction mixture is stirred with water and sodium bisulfite solution of 30% strength, separated, the methylene chloride solution is washed with water and sodium bicarbonate solution, dried, and evaporated in vacuo. The resulting 16α-methyl-21-acetoxy-allopregnane-17α-ol-3:11:20-trione is purified by recrystallization from acetone. It melts at 214–216° C.

*Example 3*

5 cc. of alcohol and 5 cc. of acetyl chloride are added to 200 cc. of chloroform containing about 0.5% of alcohol. After 30 minutes, 30.0 grams of 16α-methyl-allopregnane-3β:11α:17α-triol-20-one are added, and 90 cc. of a 1.01-molar solution of bromine in chloroform are then added dropwise in the course of one hour with stirring. The 21-bromide separates as a white, colorless powder. After the addition of bromine is complete, the mixture is stirred for one hour and the disolved hydrohalic acids are blown off by introducing a strong current of nitrogen. The 21-bromide is then suction-filtered, washed with petroleum ether and the crude bromide taken up in 500 cc.

of acetone. After adding 25 grams of potassium acetate and 3.0 grams of potassium iodide, the mixture is stirred for 4 hours at 80° C. under reflux, allowed to cool, filtered off from any undissolved salts, cooled to 0° C. and a solution of 30 grams of N-bromacetamide in 250 cc. of water is then aded. The mixture is allowed to stand for 4 hours at 0° C. in the dark, a solution of 60 grams of sodium sulfite in 500 cc. of water is added, the whole is agitated well and extracted several times with methylene chloride. The methylene chloride solutions are washed and dried and yield on evaporation a residue from which there are obtained by crystallization from ethyl acetate-ethyl-n-butyl ether 16.22 grams of crude 16α-methyl-21-acetoxy-allopregnane-11α:17α-diol-3:20-dione.

*Example 4*

563 mg. of 16α-methyl-allopregnane-3β:11α:17α-triol-20-one are suspended in 30 cc. of chloroform to which 0.5 cc. of methanol and 0.5 cc. of acetyl bromide have been added 1 hour previously. Within 1 hour 2.8 cc. of a solution of bromine in chloroform (containing 0.576 millimol of bromine per cc.) is stirred in dropwise. During the dropwise addition the bromo ketone at first separates in oily form and then in crystalline form, while the undissolved starting material gradually disappears. When all bromine has been added, the mixture is stirred on for 30 minutes; 100 cc. of hexane are then added, the mixture is suction-filtered, and the filter residue is rinsed with 50 cc. of hexane. The crude 21-bromide is reacted as described in Example 2 with potassium acetate in acetone without, however, adding potassium iodide, and after separating the inorganic salts the product is oxidized with N-bromacetamide. By crystallization from a mixture of acetonitrile and ether there are obtained 305 mg. of pure 16α-methyl-21-acetoxy-allopregnane-11α:17α-diol-3:20-dione melting at 175–177° C.

The exchange of the bromine atom and the oxidation can also be carried out in two stages in the following way:

A solution of the crude, crystalline bromo ketone in 5.0 cc. of dimethyl formamide is mixed with 600 mg. of powdered, anhydrous sodium acetate and the mixture is stirred for 2½ hours at 80° C. under nitrogen. 30 cc. of water are added, the smeary product is taken up in methylene chloride, the solution is repeatedly washed with water, dried over magnesium sulfate and evaporated to dryness in a water-jet vacuum. The residue is dried for 2 hours in a high vacuum at 60° C. (crude product: 630 mg.). The resulting 16α-methyl-21-acetoxy-allopregnane-3β:11α:17α-triol-20-one crystallizes from ether in large crystals containing ether; at 74–80° C. they turn opaque, melt partially at 126–130° C. and then solidify again, and melt finally at 167–168° C. Optical rotation $[\alpha]_D^{27.5} = +15.0° \pm 1.2°$ (c.=0.7316 in chloroform). When recrystallized from acetonitrile the compound separates in the form of crystals melting at 218° C. The infrared spectrum in methylene chloride contains inter alia the following characteristic bands: at 2.77μ with shoulder at 2.85μ (hydroxyl); 5.71μ and 5.77μ (acetate with 20-ketone) and 8.14μ (acetate). By acetylation with pyridine and acetic anhydride there is obtained 16α-methyl - 3β:11α:21-triacetoxy-allopregnane-17α-ol-20-one melting at 186–187° C.

Since the free 3β-hydroxy compound crystallizes badly, the subsequent oxidation is advantageously performed with the crude acetoxy ketone: 670 mg. of the above crude acetoxy ketone are dissolved in 6.0 cc. of acetone, cooled to 0° C., and mixed with a solution of 425 mg. of N-bromo-acetamide in water. The reaction mixture is kept for 2 hours at 0° C., a solution of 850 mg. of sodium sulfite in 10 cc. of water is added, the whole is diluted with water and repeatedly extracted with methylene chloride. The extracts are washed twice with water, dried and evaporated in a water-jet vacuum. Crystallization of the crude product (678 mg.) from ether yields a first fraction (366 mg.) of pure 16α-methyl-21-acetoxy-allopregnane-11α:17α-diol-3:20-dione melting at 175–177° C. and a second fraction of 98 mg. of a slightly less pure product. The pure product has an optical rotation $$[\alpha]_D^{27} = -34.1° \pm 1.1°$$

(c.=1.289 in chloroform) and displays in the infrared spectrum in methylene chloride solution the following characteristic bands: at 2.76μ with shoulder at 2.85μ (hydroxyl); 5.31μ and 6.15μ (acetate); 5.77μ (20-ketone) and 5.78μ (3-ketone).

Acetylation of this product with acetanhydride and pyridine yields 16α - methyl-11α:21-diacetoxy-allopregnane-17α-ol-3:20-dione melting at 167–170° C. The infrared spectrum of this compound contains characteristic bands inter alia at 5.77μ with inflexions at 5.71μ and 5.82μ (acetates, 3-ketone and 20-ketone).

*Example 5*

905 mg. of 16α-methyl-21-acetoxy-allopregnane-11α:17α-diol-3:20-dione are dissolved in 9 cc. of pyridine. The solution is cooled to 0° C. and treated with 0.9 cc. of methanesulfonyl chloride, kept for 6 hours at the same temperature and then poured over ice. The resulting suspension is shaken with a 1:2 mixture of ethyl acetate and ether. The ethyl acetate+ether solution is washed with dilute hydrochloric acid, water, dilute sodium carbonate solution and water, dried and evaporated in vacuo, to yield 1.354 grams of amorphous 16α-methyl-11α-mesyloxy-21-acetoxy-allopregnane-17α-ol-3:20-dione.

From this mesylate the 11α-sulfonic acid ester group may be split off as follows:

The residue obtained is mixed with 9 cc. of an anhydrous solution of lithium chloride of 10% strength in dimethyl formamide. The resulting solution is heated for 2 hours under nitrogen on a boiling water bath, diluted with methylene chloride, and the methylene chloride solution is washed with dilute hydrochloric acid, water, dilute sodium carbonate solution and water, dried and evaporated in vacuo. The residue (1.007 grams) is dissolved in and recrystallized from acetone+methylene chloride, to yield 767 mg. of $\Delta^{9(11)}$ - 16α-methyl - 21-acetoxy-allopregnene-17α-ol-3:20-dione melting at 216–224° C. Optical rotation $$[\alpha]_D^{27.3} = +72.4°$$

(c.=1.2434 in chloroform). The infrared spectrum contains bands inter alia at 2.76μ, 5.70μ, 5.77μ (shoulder), 5.82μ, 7.24μ (shoulder), 7.30μ, 8.75μ, 9.40μ, 9.55μ and 10.20μ.

Some more of the identical compound, but of a slightly lower melting point, can be isolated from the mother liquors.

*Example 6*

900 mg. of para-toluenesulfonic acid chloride are added to a solution of 1.0 gram of 16α-methyl-21-acetoxy-allopregnane-11α:17α-diol-3:20-dione in 8.0 cc. of methylene chloride and 2.0 cc. of pyridine, and the mixture is kept for 20 hours at room temperature, diluted wtih methylene chloride, repeatedly washed with N-hydrochloric acid and with water, and the organic solutions are dried and evaporated in water-jet vacuum. Crystallization of the residue from methylene chloride+ether yields 1.10 grams of 16α - methyl - 11α-tosyloxy-21-acetoxy-allopregnane-17α-ol-3:20-dione melting at 145–147° (with decomposition).

637 mg. of this tosylate are heated for 2 hours at 80° C. in 7 cc. of dimethyl formamide containing about 10% of anhydrous lithium chloride. After a short time the reaction product begins to crystallize out. It is diluted wtih 70 cc. of water, the crystals are suctioned off and rinsed with water. Recrystallization from acetone+methylene chloride+ether yields 454 mg. of pure $\Delta^{9(11)}$-

16α - methyl - 21-acetoxy-allopregnene-17α-ol-3:20-dione melting at 216–224° C.

Example 7

2.0 grams of 16α-methyl-21-acetoxy-allopregnane-11α: 17α-diol-3:20-dione are dissolved in 75 cc. of methanol. The solution is freed from dissolved oxygen by being boiled for a short time, cooled under nitrogen, and a solution of 2.0 grams of potassium bicarbonate in 10 cc. of water is added. The whole is stirred overnight at room temperature, 1.2 cc. of glacial acetic acid is added and the clear solution evaporated nearly to dryness in a water jet vacuum. The residue is suspended in 100 cc. of water and 16α-methyl-allopregnane-11α:17α:21-triol-3:20-dione separated by filtration. By crystallization from methylene chloride-acetone there are obtained 1.32 grams of the pure compound in the form of small needles melting at 227–231° C; optical rotation $[\alpha]_D = +16.8°$ (c.=0.3569 in chloroform-alcohol 1:1). From the mother liquor a further quantity of somewhat less pure substance can be obtained.

For selective reacetylation in 21-position 645 mg. of the above 16α - methyl - allopregnane - 11α:17α:21-triol-3:20-dione are dissolved in 5.0 cc. of pyridine, cooled to 0° C., 0.19 cc. of acetic anhydride is added and the whole allowed to stand for 24 hours at 0°–5° C. The reaction solution is then poured into water, extracted with methylene chloride and the extracts washed with dilute hydrochloric acid and with water. After evaporation the residue (765 mg.) yields on crystallization from ether 444 mg. of pure 16α-methyl-21 - acetoxy - allopregnane-11α:17α-diol-3:20-dione melting at 175–177° C.

Example 8

In the 3:11:20-trione described in Example 1 the 11-keto group can be reduced to the 11β-hydroxyl group as follows:

A mixture of 0.5 gram of semicarbazide, 0.5 gram of 16α - methyl-21-acetoxy - allopregnane-17α-ol - 3:11:20-trione and 6 cc. of ethanol is refluxed for 3 days under nitrogen and then concentrated; water is added, and the crystalline 16α-methyl-21-acetoxy-allopregnane - 17α - ol-11-one-3:20-disemicarbazone is suctioned off; it begins to decompose above 300° C.

0.2 gram of sodium borohydride is added to a solution of 0.5 gram of the above 3:20-disemicarbazone in 10 cc. of tetrahydrofuran and 3 cc. of water, and the whole is refluxed for 2 hours, then cooled, and the excess sodium borohydride is decomposed by the careful addition of acetic acid. The reaction solution is concentrated in vacuo and extracted with methylene chloride+ether, washed with dilute sodium bicarbonate solution and water, dried over sodium sulfate and the solvent is evaporated to yield 16α-methyl-allopregnane-11β:17α:21-triol-3:20-disemicarbazone.

A mixture of 0.3 gram of the above 3:20-disemicarbazone, 0.1 cc. of dimethyl formamide, 0.3 cc. of chloroform and 0.75 cc. of N-hydrochloric acid is refluxed for 3 hours under nitrogen, cooled, extracted with methylene chloride+ether, washed with dilute sodium bicarbonate solution and water, dried and evaporated in vacuo. The residue is crude 16α - methyl-allopregnane - 11β:17α:21-triol-3:20-dione.

Acetylation in the 21-position is performed by dissolving 0.2 gram of the resulting triol in 2 cc. of pyridine and 2 cc. of acetanhydride and keeping the whole overnight at room temperature. The reaction solution is then evaporated in vacuo and the residue is taken up in methylene chloride+ether, washed with dilute hydrochloric acid, dilute sodium carbonate solution and water, dried and evaporated. The resulting residue is 16α-methyl - 21 - acetoxy - allopregnane-11β:17α-diol-3:20-dione which is purified by chromatography and crystallization from acetone.

The same compound can be obtained from 3:11:20-triketone as follows:

A solution of 54 grams of semicarbazide hydrochloride in 60 cc. of water is mixed with a cooled mixture of 250 cc. of pyridine and 62 cc. of concentrated hydrochloric acid, and a solution of 10 grams of 16α-methyl-21-acetoxy-allopregnane-17α-ol-3:11:20-trione in 250 cc. of pyridine is then added. The whole is kept for 48 hours at 20° C., and aqueous solution of sodium acetate is added, the mixture is considerably concentrated in vacuo, and water is added, whereupon the 3:20-disemicarbazone of 16α-methyl-21-acetoxy-allopregnane-17α-ol - 3:11:20-trione separates out; it is suctioned off, thoroughly washed with water and dried in vacuo. It begins to decompose above 300° C.

10 grams of the resulting 3:20-disemicarbazone are suspended in 100 cc. of dimethyl formamide and 600 cc. of tetrahydrofuran, and at 20° C. 8 grams of sodium borohydride are slowly stirred in. The suspension is refluxed for 2 hours, again cooled, and neutralized with acetic acid. The solution is then considerably concentrated in vacuo, water is added, and the disemicarbazone of 16α-methyl-11β:17α:21-triol-allopregnane-3:20 - dione is suctioned off and washed with water. The disemicarbazone is dried in vacuo and dissolved with stirring at 20° C. in a mixture of 40 cc. of pyridine and 80 cc. of acetanhydride. After 15 hours water is added, and the mixture is concentrated in vacuo, the residue being washed with water and dried in vacuo. The resulting 21-acetoxy derivative of the disemicarbazone is dissolved in 200 cc. of glacial acetic acid, 40 cc. of pyroracemic acid and 100 cc. of a pyridine-sulfate solution are added which latter has been prepared as follows:

A cooled mixture of 20 cc. of concentrated sulfuric acid and 20 cc. of water is slowly poured into 62 cc. of pyridine, and at 20° C. the whole is made up with water to 100 cc. The disemicarbazone solution is kept for 48 hours at 20° C., diluted with water, and the suspension is extracted with ethyl acetate. The ethyl acetate solutions are then washed with dilute hydrochloric acid, water, dilute sodium carbonate solution and water, dried, and evaporated in vacuo. As residue there is obtained crude 16α-methyl-21-acetoxy-allopregnane-11β:17α-diol-3:20-dione.

Example 9

60 cc. of a 0.1-molar solution of bromine in chloroform are added dropwise at room temperature to a solution of 1 gram of 16α-methyl-allopregnane-3β:17α-diol-11:20-dione in 700 cc. of chloroform and 0.5 cc. of a solution of hydrogen bromide and glacial acetic acid of 30% strength. When the reaction solution has lost its color, it is washed with dilute sodium bicarbonate solution and water and concentrated in vacuo. 16α-methyl-21-bromo-allopregnane-3β:17α-diol-11:20-dione crystallizes and melts at about 235° C. with decomposition.

To a solution of 260 mg. of the above bromide in 60 cc. of boiling acetone there are added 320 mg. of potassium carbonate, 0.2 cc. of glacial acetic acid and 160 mg. of potassium iodide, and the mixture is boiled for 5 hours. The reaction mixture is then evaporated in vacuo to about one third of its volume and poured into ice water. The precipitated 16α - methyl - 21 - acetoxy - allopregnane-3β:17α-diol-11:20-dione is recrystallized from acetone.

1 gram of the above 21-acetate is dissolved in 20 cc. of methylene chloride and 2 cc. of pyridine; 1 gram of bromosuccinimide is added and the mixture is stirred overnight at room temperature. The clear reaction solution is stirred with water and sodium bisulfite solution of 30% strength, separated, the methylene chloride solution washed with water and sodium bicarbonate solution, dried and evaporated in vacuo. The resulting 16α-methyl-21-acetoxy-allopregnane-17α-ol-3:11:20-trione is purified by recrystallization from acetone.

What we claim is:
1. A compound of the formula

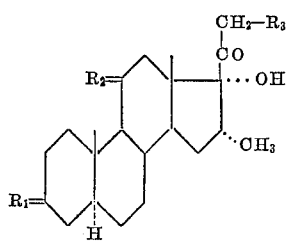

in which $R_1$ represents a member selected from the group consisting of (1) an oxo group and (2) a hydrogen atom together with a free hydroxyl group, and $R_2$ represents a member selected from the group consisting of (1) a hydrogen atom with a free α-hydroxyl group, (2) a hydrogen atom with a lower α-acyloxy group and (3) a hydrogen atom with an α-sulfonyloxy group, and $R_3$ a member selected from the group consisting of a free hydroxy and a lower acyloxy group.

2. A compound of the formula

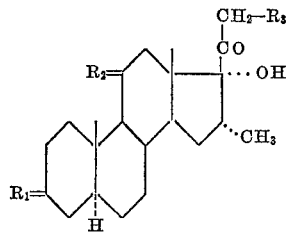

in which $R_1$ represents a member selected from the group consisting of (1) an oxo group and (2) a hydrogen atom together with a free hydroxyl group, and $R_2$ represents a member selected from the group consisting of (1) a hydrogen atom with a free α-hydroxyl group, (2) a hydrogen atom with a lower α-acyloxy group and (3) a hydrogen atom with an α-sulfonyloxy group, and $R_3$ is a bromine atom.

3. 16α - methyl - 21 - bromo - allopregnane - 3β:11α: 17α-triol-20-one.

4. 16α - methyl - 21 - acetoxy - allopregnane - 3β:11α: 17α-triol-20-one.

5. 16α - methyl - 11α:21 - diacetoxy - allopregnane-17α-ol-3:20-dione.

6. 16α - methyl - 21 - acetoxy - 11α - methane - sulfonyloxy-allopregnane-17α-ol-3:20-dione.

7. 16α - methyl - 21 - acetoxy - 11α - tosyloxy - allopregnane-17α-ol-3:20-dione.

8. $\Delta^{9(11)}$ - 16α - methyl - 21 - acetoxy - allopregnane-17α-ol-3:20-dione.

9. 16α - methyl - 11α - R - 17α - hydroxy - 21- acetoxy-allopregnane-3:20-dione, in which R is selected from the group consisting of acetoxy, mesyloxy and tosyloxy.

References Cited in the file of this patent
UNITED STATES PATENTS

| | | |
|---|---|---|
| 2,640,839 | Wendler | June 2, 1953 |
| 2,852,511 | Fried | Sept. 16, 1958 |
| 2,980,713 | Chmerda et al. | Apr. 18, 1961 |
| 3,013,945 | Havsky et al. | Dec. 19, 1961 |

OTHER REFERENCES

Kritchevsky et al.: J.A.C.S., vol. 74, pages 483–62 (1952).

Arth et al.: J.A.C.S., vol. 80, pages 3160–1 (June 20, 1958).

Arth et al.: J.A.C.S., vol. 80, pages 3161–3 (June 20, 1958).

Oliveto et al.: J.A.C.S., vol. 80, pages 6687–8 (December 20, 1958).